(12) United States Patent
Uchida

(10) Patent No.: US 12,085,118 B2
(45) Date of Patent: Sep. 10, 2024

(54) FIXTURE

(71) Applicant: KITAGAWA INDUSTRIES CO., LTD., Inazawa (JP)

(72) Inventor: Tatsuya Uchida, Kasugai (JP)

(73) Assignee: KITAGAWA INDUSTRIES CO., LTD., Inazawa (JP)

( * ) Notice: Subject to any disclaimer, the term of this patent is extended or adjusted under 35 U.S.C. 154(b) by 658 days.

(21) Appl. No.: 17/280,523

(22) PCT Filed: Sep. 26, 2019

(86) PCT No.: PCT/JP2019/037920
§ 371 (c)(1),
(2) Date: Mar. 26, 2021

(87) PCT Pub. No.: WO2020/067316
PCT Pub. Date: Apr. 2, 2020

(65) Prior Publication Data
US 2022/0042532 A1 Feb. 10, 2022

(30) Foreign Application Priority Data
Sep. 27, 2018 (JP) .................................. 2018-181935

(51) Int. Cl.
*F16B 21/08* (2006.01)
*F16B 5/06* (2006.01)
*F16B 19/00* (2006.01)

(52) U.S. Cl.
CPC ................ *F16B 5/06* (2013.01); *F16B 19/00* (2013.01); *F16B 19/004* (2013.01)

(58) Field of Classification Search
CPC ...... F16B 21/082; F16B 21/086; F16B 5/065; F16B 19/004
See application file for complete search history.

(56) References Cited

U.S. PATENT DOCUMENTS 3,688,635 A * 9/1972 James .................... H05K 7/142
24/336
4,635,325 A * 1/1987 Yagi ..................... H05K 7/1417
24/297

(Continued)

FOREIGN PATENT DOCUMENTS

| CN | 207500392 U | 6/2018 |
| JP | 1989045018 U | 3/1989 |
| WO | 2017/073678 A1 | 5/2017 |

OTHER PUBLICATIONS

International Search Report for PCT/JP2019/037920, issued on Nov. 19, 2019.

(Continued)

*Primary Examiner* — Flemming Saether
(74) *Attorney, Agent, or Firm* — Meunier Carlin & Curfman LLC

(57) ABSTRACT

A fixture includes two mounted portions and an interposing portion. At least the one mounted portion includes a strut portion, a check portion, and an abutment portion. The strut portion is insertable into a mounting hole provided in a mounting target. The check portion is caught on the mounting target on an outlet side of the mounting hole. The abutment portion abuts on the mounting target on an inlet side of the mounting hole. When any one of the mounting target or the fixture vibrates, the check portion and the abutment portion deform to suppress a vibration in a direction parallel to an insertion direction. When any one of the mounting target or the fixture vibrates, the interposing portion deforms to suppress a vibration in a direction parallel to a plane orthogonal to the insertion direction.

3 Claims, 16 Drawing Sheets

(56) References Cited

U.S. PATENT DOCUMENTS

| | | | | |
|---|---|---|---|---|
| 4,644,614 | A * | 2/1987 | Mizusawa | F16B 5/0607 24/297 |
| 5,601,260 | A * | 2/1997 | Shinohara | H04N 5/645 248/68.1 |
| 5,685,682 | A * | 11/1997 | Glime | F16B 21/082 411/510 |
| 6,399,888 | B1 * | 6/2002 | Chen | H05K 7/142 411/501 |
| 7,428,770 | B2 * | 9/2008 | Dickenson | F16B 5/0614 24/295 |
| 9,115,743 | B2 * | 8/2015 | Yamamoto | F16B 19/1081 |
| 9,695,850 | B2 * | 7/2017 | Hirakawa | F16B 5/06 |
| 10,731,685 | B2 * | 8/2020 | Uchida | F16B 21/082 |
| 11,519,445 | B2 * | 12/2022 | Kumar | B60R 13/0206 |
| D990,300 | S * | 6/2023 | Liebelt | D8/382 |
| 2014/0215772 | A1 | 8/2014 | Ramsauer | |
| 2018/0328394 | A1 | 11/2018 | Uchida | |

OTHER PUBLICATIONS

Written Opinion for PCT/JP2019/037920, issued on Nov. 19, 2019.
First Office Action for Chinese Patent Application No. 201980063829.7 issued on Mar. 2, 2022 and its machine-generated full English translation, 9 pages.

* cited by examiner

FIXTURE

TECHNICAL FIELD

The present disclosure relates to a fixture.

BACKGROUND ART

There has been known a fixture used to fix an article (equivalent to an example of a first object in the present disclosure) to another member (equivalent to an example of a second object in the present disclosure) (for example, see Patent Document 1). The fixture described in Patent Document 1 includes a portion made of soft resin (hereinafter referred to as a soft portion) and portions made of hard resin (hereinafter referred to as hard portions). When any one of the article and the other member vibrates, the fixture suppresses the vibration in the soft portion, thereby suppressing transmission of the vibration from one to the other.

CITATION LIST

Patent Literature

Patent Document 1: WO 2017/073678

SUMMARY OF INVENTION

Technical Problem

However, with the fixture including both the soft portion and the hard portion as described above, manufacturing processes are more likely to be complex, and, for example, molds used during the manufacturing of the fixture are also more likely to be complex compared to a fixture made of a single resin material. Note that formation of the range equivalent to the soft portion with the hard portion allows the use of a single resin material. However, it is difficult to suppress the vibration by just this action. In addition, the formation of the range equivalent to the hard portion with the soft portion also allows the use of a single resin material. However, in this case, for example, bending rigidity is excessively deteriorated, possibly causing a problem, such as significant deterioration of insertability into a mounting hole.

In one aspect of the present disclosure, providing a fixture that can be made of a single resin material and has excellent vibration-damping performance is desirable.

Solution to Problem

One aspect of the present disclosure is a fixture. The fixture is used to fix a first object to a second object. When any one of the objects of the first object and the second object vibrates, the fixture allows suppressing transmission of the vibration to the other object. The fixture includes two mounted portions and an interposing portion. Among the two mounted portions, the first object is a mounting target of the one mounted portion and the second object is a mounting target of the other mounted portion. The two mounted portions are mounted to the respective mounting targets. The interposing portion is interposed between the two mounted portions.

Among the two mounted portions, at least the one mounted portion includes a strut portion, a check portion, and an abutment portion. The strut portion is insertable into a mounting hole provided in the mounting target. The strut portion is disposed in the mounting hole when the strut portion is inserted into the mounting hole. The check portion is provided on a distal end side in an insertion direction to the mounting hole on the strut portion. When the strut portion is inserted into the mounting hole from an inlet side, the check portion is caught on the mounting target on an outlet side of the mounting hole to suppress pulling out the strut portion in a direction opposite to the insertion direction to the mounting hole. The abutment portion is provided on a rear end side in the insertion direction to the mounting hole on the strut portion. When the strut portion is inserted into the mounting hole, the abutment portion abuts on the mounting target on the inlet side of the mounting hole to suppress pushing the strut portion into the insertion direction to the mounting hole further.

When any one of the mounting target or the fixture performs a vibration containing a component that relatively displaces the mounted portion and the strut portion in a direction parallel to the insertion direction, the check portion and the abutment portion deform according to the displacement to suppress the vibration in the direction parallel to the insertion direction.

When any one of the mounting target or the fixture performs a vibration containing a component that relatively displaces the two mounted portions in a direction parallel to a plane perpendicular to the insertion direction, the interposing portion deforms according to the displacement to suppress the vibration in the direction parallel to the plane perpendicular to the insertion direction. The abutment portion includes a projection projecting toward the mounting target. The abutment portion abuts on the mounting target at a distal end in a projection direction of the projection. The check portion includes a snap piece and when inserted into the mounting hole, the snap piece elastically deforms and narrows down in width. After the snap piece passes through the mounting hole, the elastically deformed shape is restored and the snap piece extends in width to be caught on the first object on the outlet side of the mounting hole. When any one of the mounting target or the fixture performs the vibration containing the component that relatively displaces the mounted portion and the strut portion in the direction parallel to the insertion direction, the projection and the snap piece deform according to the displacement to suppress the vibration in the direction parallel to the insertion direction. The snap piece has a contact surface in contact with the mounting target. The contact surface has a groove to reduce a contact area with the mounting target compared to a case of without the groove.

According to the fixing device configured in this manner, when any one of the mounting target or the fixture performs the vibration containing the component that relatively displaces the mounting target and the strut part in the direction parallel to the insertion direction, mainly the check portion and the abutment portion deform. In association with this deformation, the check portion and the abutment portion cause vibration energy to be lost to suppress the vibration in the direction parallel to the insertion direction. In addition, when the vibration contains the component that relatively displaces the two mounted portions in the direction parallel to the plane orthogonal to the insertion direction, mainly the interposing portion deforms. In association with this deformation, the interposing portion causes the vibration energy to be lost to suppress the vibration in the direction parallel to the plane orthogonal to the insertion direction.

Accordingly, among the first object and the second object, even when any one of objects vibrates in any direction, the vibration can be suppressed and the transmission of the vibration from one object to the other object can be suppressed. In addition, since the vibrations in different directions are suppressed by different portions, the transmission of vibration from one object to the other object can be suppressed even when, for example, a portion made of a soft resin that allows suppressing vibrations in all directions by the same portion is not employed. Therefore, the structure can be simplified and the manufacturing process thereof can be simplified compared to a fixture provided with a hard portion and a soft portion.

Other characteristics and advantages of the present invention will become apparent from the following description with reference to the accompanying drawings. Note that, in the accompanying drawings, the same reference numerals are assigned to the same or similar configurations.

BRIEF DESCRIPTION OF DRAWINGS

The accompanying drawings are included in the specification, constitute a part thereof, and illustrate embodiments of the present invention, and together with the description, the drawings are used to explain the principles of the present invention.

DESCRIPTION OF EMBODIMENTS

Next, the fixture described above will be described below according to exemplary embodiments.

(1) First Embodiment

Figure 2A:
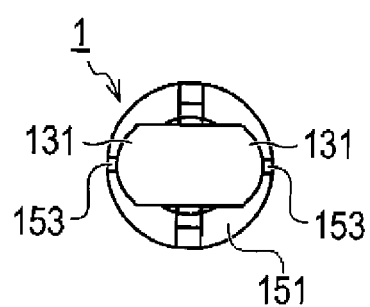
FIG. 2A is a plan view of the fixture according to the first embodiment.

Next, the first embodiment will be described. In the following description, the description will be made using respective directions of the front, rear, left, right, upper, and lower illustrated in the drawings. These respective directions are relative directions. The direction in which the portion of a fixture 1 illustrated in the plan view (see FIG. 2A) is oriented is defined as upper, the direction in which the portion illustrated in the front view (see FIG. 2B) is oriented is defined as front, the direction opposite to the front is defined as rear, the direction in which the portion illustrated in the right side view (FIG. 2C) is oriented is defined as right, the direction opposite to the right is defined as left, and the direction in which the portion illustrated in the bottom view (see FIG. 2D) is oriented is defined as lower. However, it should be understood that these respective directions are defined only for the purpose of facilitating descriptions of relative positional relationship of respective portions constituting the fixture 1. Therefore, for example, in a usage state of the fixture 1, it is undefined which direction the fixture 1 is oriented in use. The left side view of the fixture 1 appears symmetrical to the right side view. A back view of the fixture 1 appears the same as the front view.

Figure 1:
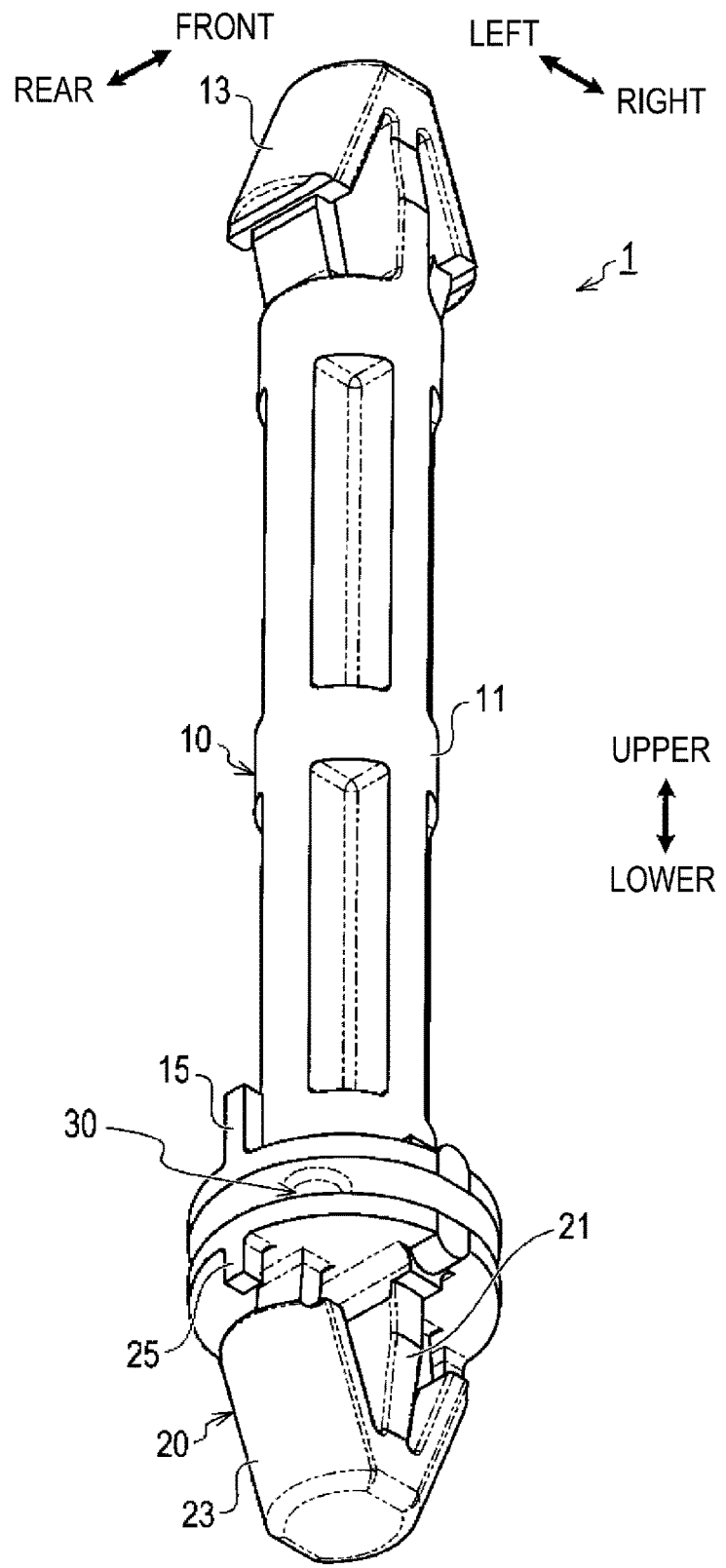
FIG. 1 is a perspective view of a fixture according to a first embodiment.

As illustrated in FIG. 1, the fixture 1 includes two mounted portions 10, 20 and an interposing portion 30. The two mounted portions 10, 20 differ in shape and size according to respective mounting targets, but include functionally equivalent configurations. Specifically, one mounted portion 10 includes a strut portion 11, a check portion 13, and an abutment portion 15. The other mounted portion 20 includes a strut portion 21, a check portion 23, and an abutment portion 25.

As illustrated in FIG. 2A, FIG. 2B, FIG. 2C, and FIG. 2D, the strut portion 11 has a shaft portion 111 and a plate-like portion 113. The strut portion 21 has a plate-like portion 213. The plate-like portion 113 and the plate-like portion 213 are portions configured to have substantially the same shape. In other words, the strut portion 21 is shaped such that the shaft portion 111 is eliminated from the strut portion 11 and only the plate-like portion 113 is left. The shaft portion 111 has a shape in which depressed portions are partially provided in its surface having a cylindrical body as its base.

The check portion 13 includes two snap pieces 131 that extend diagonally downward from the upper end of the plate-like portion 113. The two snap pieces 131 are configured to be swingable to the plate-like portion 113 with vicinities of boundaries with the plate-like portion 113 as their swing centers. Grooves 133 are formed on the lower surfaces of the snap pieces 131. The groove 133 has a shape in which the up-down direction is in the depth direction, the bottom is provided on the upper end side, and extends in the front-rear direction.

The check portion 23 includes two snap pieces 231 that extend diagonally upward from the lower end of the plate-like portion 213. The two snap pieces 231 are configured to be swingable to the plate-like portion 213 with vicinities of boundaries with the plate-like portion 213 as their swing centers. Grooves 233 are formed on the upper surfaces of the snap pieces 231. The groove 233 has a shape in which the up-down direction is in the depth direction, the bottom is provided on the lower end side, and extends in the front-rear direction.

The abutment portion 15 includes a circular plate portion 151 and two projections 153. The two projections 153 project upward from the upper surface of the circular plate portion 151. The abutment portion 25 includes a circular plate portion 251 and two projections 253. The two projections 253 project downward from the lower surface of the circular plate portion 251. Band-like portions 155 are provided between the lower ends of the snap pieces 131 and the upper end of the shaft portion 111. Band-like portions 255 are provided between the upper ends of the snap pieces 231 and the upper surface of the circular plate portion 251.

Figure 2B:
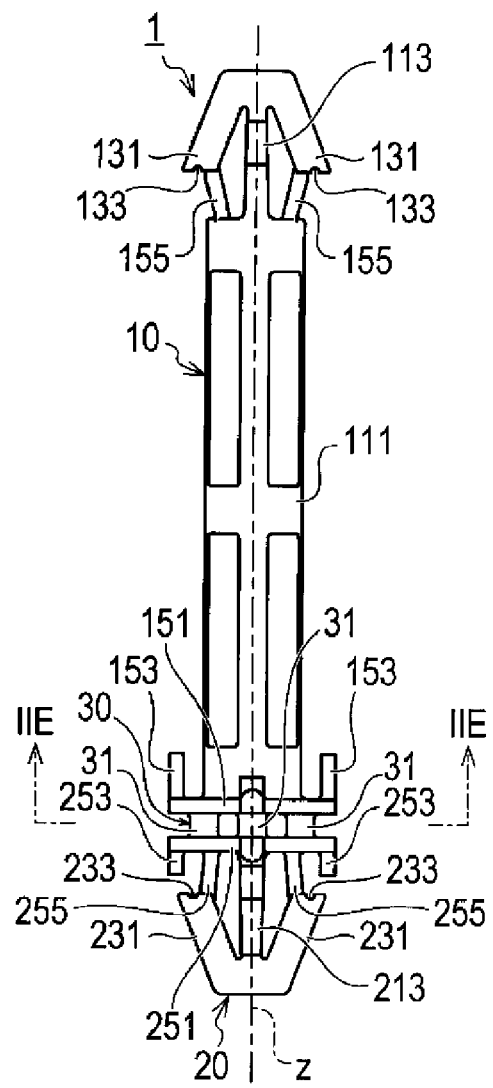
FIG. 2B is a front view of the fixture according to the first embodiment.
Figure 2C:
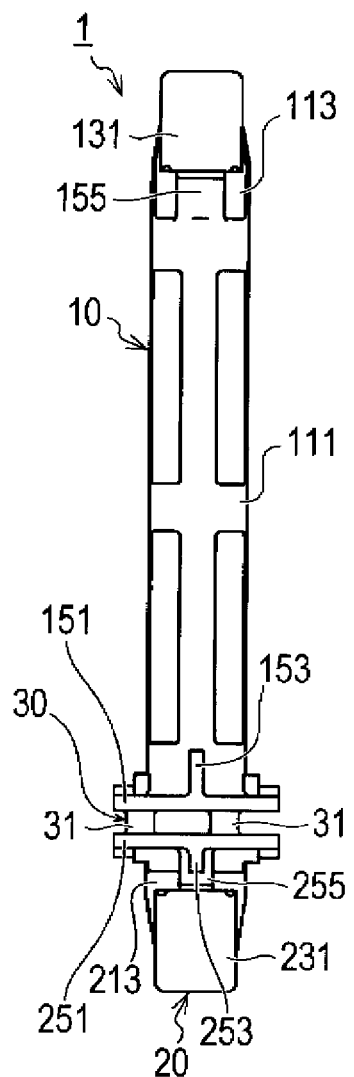
FIG. 2C is a right side view of the fixture according to the first embodiment.
Figure 2D:
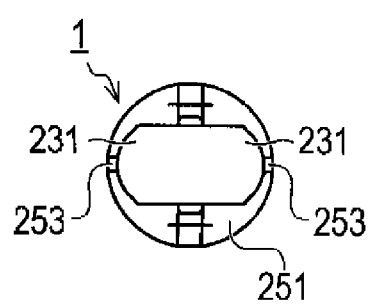
FIG. 2D is a bottom view of the fixture according to the first embodiment.
Figure 2E:
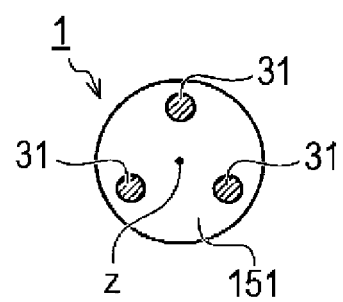
FIG. 2E is a cross-sectional view of a cut surface indicated by the line IIE-IIE in FIG. 2B.

As illustrated in FIG. 2B and FIG. 2E, the interposing portion 30 includes three coupling portions 31. The three coupling portions 31 are each formed in a substantially cylindrical shape, and have one ends each connected to one mounted portion 10 and the other ends each connected to the other mounted portion 20. The coupling portion 31 has a diameter smaller than that of the shaft portion 111 and bending rigidity lower than that of the shaft portion 111. Additionally, as illustrated in FIG. 2E, the three coupling portions 31 have a rotational symmetry in which when the fixture 1 is rotated by 120 degrees around an axis line z (see FIG. 2B and FIG. 2E) extending in the up-down direction, the coupling portions 31 have the shape same as that before the rotation.

The respective portions constituting the fixture 1 are integrally molded with a single resin material by injection molding. The resin material is preferably a hard elastomer having hardness measured by a type D durometer in accordance with JIS K 6253 within a range from D50 to D59, and the hardness is more preferably within a range from D53 to D56. Examples of such an elastomer include, for example, a commercially available polyester-based thermoplastic elastomer (for example, "product name: PELPRENE (trade name) P-50DFR, manufactured by TOYOBO CO., LTD., hardness: D54" or "product name: Hytrel (trade name) 5547F, available from DU PONT-TORAY CO., LTD., hardness: D55").

Figure 3A:
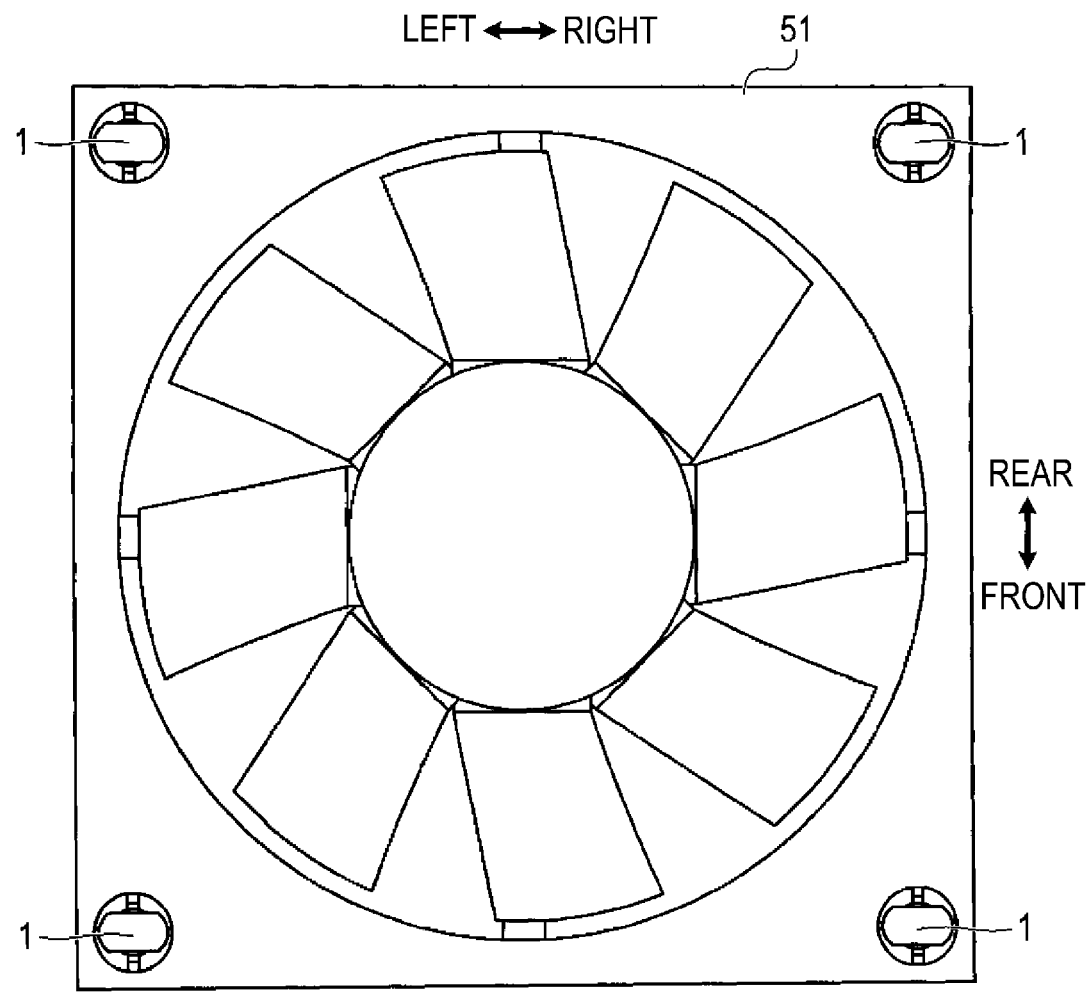
FIG. 3A is a plan view illustrating a usage state of the fixture according to the first embodiment.
Figure 3B:
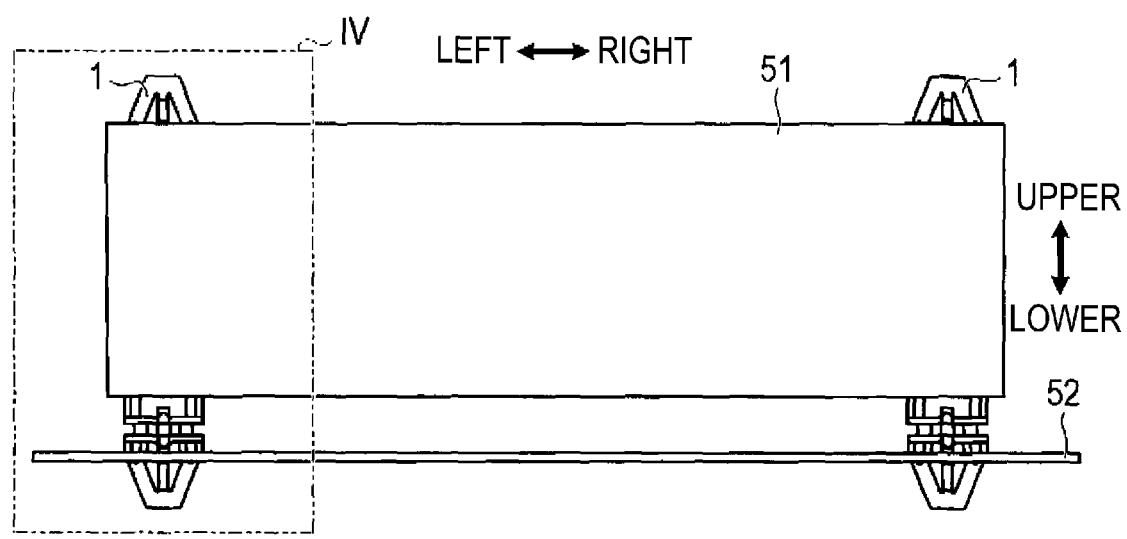
FIG. 3B is a front view illustrating the usage state of the fixture according to the first embodiment.
Figure 4:
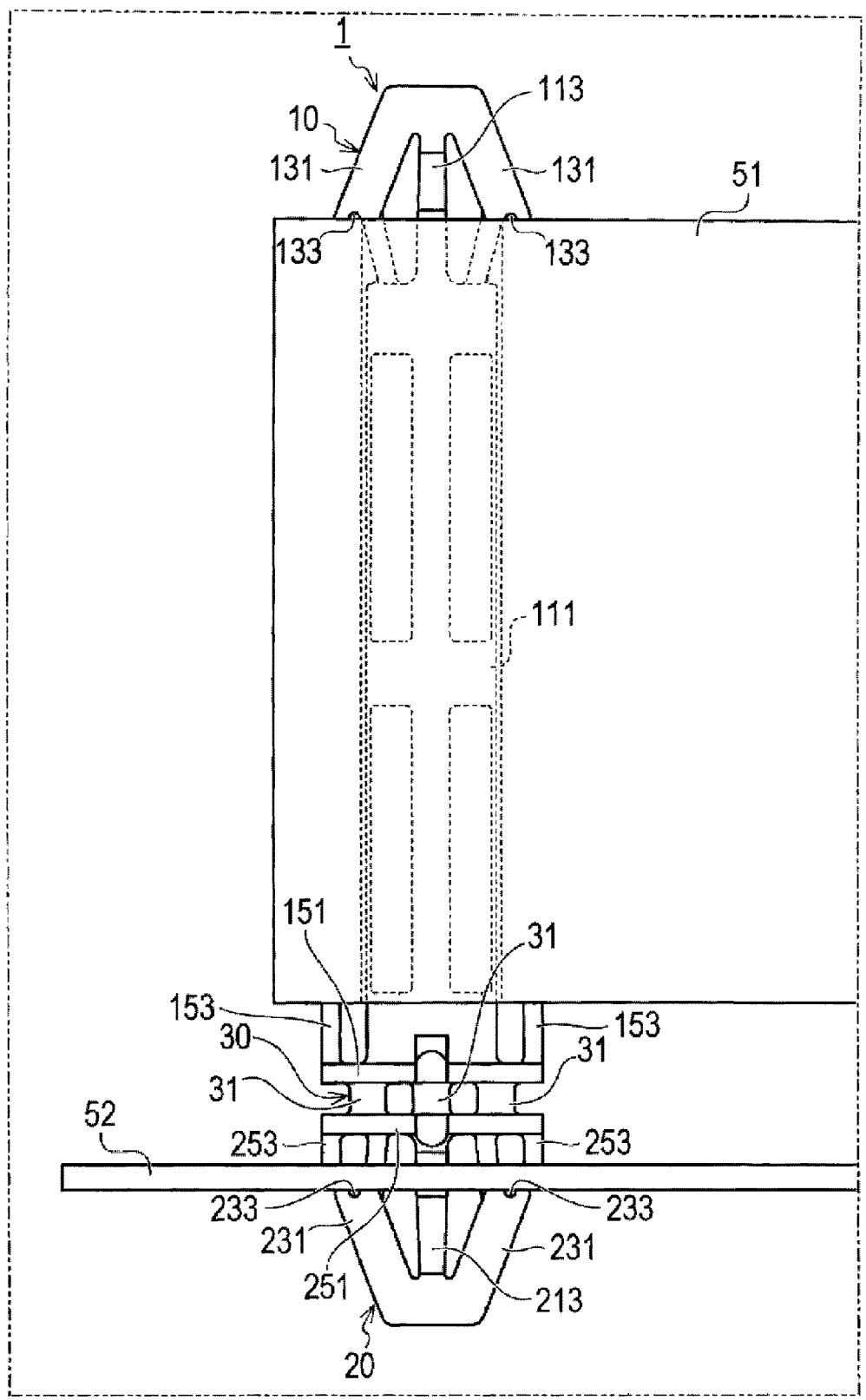
FIG. 4 is an enlarged view of the portion IV indicated in FIG. 3B.

As illustrated in FIG. 3A, FIG. 3B, and FIG. 4, for example, the fixture 1 configured as described above is used to fix a fan 51 (equivalent to an example of a first object in the present disclosure) to a panel 52 (equivalent to an example of a second object in the present disclosure). In the present embodiment, mounting holes are provided in the four corners of the fan 51, and one mounted portions 10 are inserted into the mounting holes. When the mounted portion 10 is inserted into the mounting hole, the mounting hole allows the mounted portion 10 to be held so as not to be displaced in a direction other than the axial direction.

When the mounted portion 10 is inserted into the mounting hole, the snap pieces 131 of the mounted portion 10 elastically deform, and after the snap pieces 131 pass through the mounting hole, the elastically deformed shapes are restored. As a result, the mounted portion 10 is caught on the upper surface of the fan 51 at the lower ends of the snap pieces 131 on the outlet side of the mounting hole, and the mounted portion 10 cannot be pulled out from the mounting hole. Additionally, the abutment portion 15 abuts on the lower surface of the fan 51 at the upper ends of the projections 153 on the inlet side of the mounting hole. As a result, the mounted portion 10 cannot be pushed into the mounting hole further. Thus, with these configurations, the fixtures 1 are fixed to the fan 51.

On the other hand, the snap pieces 231 of the mounted portion 20 are inserted into a mounting hole provided in the panel 52. At this time, the snap pieces 231 of the mounted portion 20 elastically deform, and after the snap pieces 231 pass through the mounting hole, the elastically deformed shapes are restored. As a result, the mounted portion 20 is caught on the lower surface of the panel 52 at the upper ends of the snap pieces 231 on the outlet side of the mounting hole, and the mounted portion 20 cannot be pulled out from the mounting hole. Additionally, the abutment portion 25 abuts on the upper surface of the panel 52 at the lower ends of the projections 253 on the inlet side of the mounting hole. As a result, the mounted portion 20 cannot be pushed into the mounting hole further. Thus, with these configurations, the fixtures 1 are fixed to the panel 52.

In the mounting state as described above, the fan 51 is sandwiched between the lower ends of the snap pieces 131 of the check portion 13 and the upper ends of the projections 153 of the abutment portion 15. When the fan 51 vibrates in this state, as long as the vibration contains a component causing the vertical displacement, the snap pieces 131 and the projections 153 elastically deform in response to the vertical movement of the fan 51, thus permitting the fan 51 and the mounted portions 10 to move up and down relatively. Then, in association with the deformation of the snap pieces 131 and the projections 153, the vibrational energy is lost.

When the fan 51 vibrates, as long as the vibration contains a component causing the horizontal displacement, the coupling portions 31 elastically deform in the interposing portion 30, thus permitting the fan 51 and the panel 52 to be relatively displaced in the horizontal direction. Then, in association with the deformation of the coupling portions 31, the vibrational energy is lost. Furthermore, when the vibration of the fan 51 is transmitted to the mounted portions 20, the snap pieces 231 and the projections 253 elastically deform in response to the vibration of the mounted portions 20, thus permitting the panel 52 and the mounted portions 20 to be relatively displaced. Then, in association with the deformation of the snap pieces 231 and the projections 253, the vibrational energy is lost.

With such a mechanism, the vibration of the fan 51 is attenuated in the middle of the transmission to the panel 52, and therefore the direct transmission of the vibration of the fan 51 to the panel 52 can be suppressed. In other words, the vibration component matched with the axial direction (the up-down direction in the drawing) of the fixture 1 and the vibration component perpendicular to the axial direction of the fixture 1 are reduced or absorbed by the different parts provided with the fixture 1.

Accordingly, as long as a structure that can reduce or absorb the vibration component matched with the axial direction of the fixture 1 is employed, it is sufficient even when the structure that allows suppressing the vibration component perpendicular to the axial direction of the fixture 1 is not employed in the check portion 13 and the abutment portion 15, or the check portion 23 and the abutment portion 25. On the other hand, as long as a structure that can reduce or absorb the vibration component matched with the axial direction of the fixture 1 is employed, it is sufficient even when the structure that allows suppressing the vibration component matched with the axial direction of the fixture 1 is not employed in the interposing portion 30. Thus, the fixture 1 ensures obtaining a desired vibration-damping effect even when a part of the fixture 1 is not configured of a soft resin portion that deforms by receiving a force in any direction. Therefore, the structure of the fixture 1 can be simplified compared to the known fixture provided with the soft resin portion, and the manufacturing process thereof can be simplified.

In addition, since the fixture 1 has the grooves 133 on the lower surfaces of the snap pieces 131, the contact areas between the snap pieces 131, which serve as propagation paths for vibration, and the upper surface of the fan 51 can be reduced compared to a case where the grooves 133 are not formed. In addition, since the fixture 1 has the grooves 233 on the upper surfaces of the snap pieces 231, the contact areas between the snap pieces 231, which serve as propagation paths for vibration, and the lower surface of the panel 52 can be reduced compared to a case where the grooves 233 are not formed.

In addition, since the fixture 1 includes the three coupling portions 31, which are provided on the interposing portion 30, having the shape having the rotational symmetry as described above, compared to a case where the coupling portions 31 have a shape not having a rotational symmetry, a load is evenly applied to the three coupling portions 31 and the three respective coupling portions 31 can exert the similar damping effects without a bias.

Figure 5A:
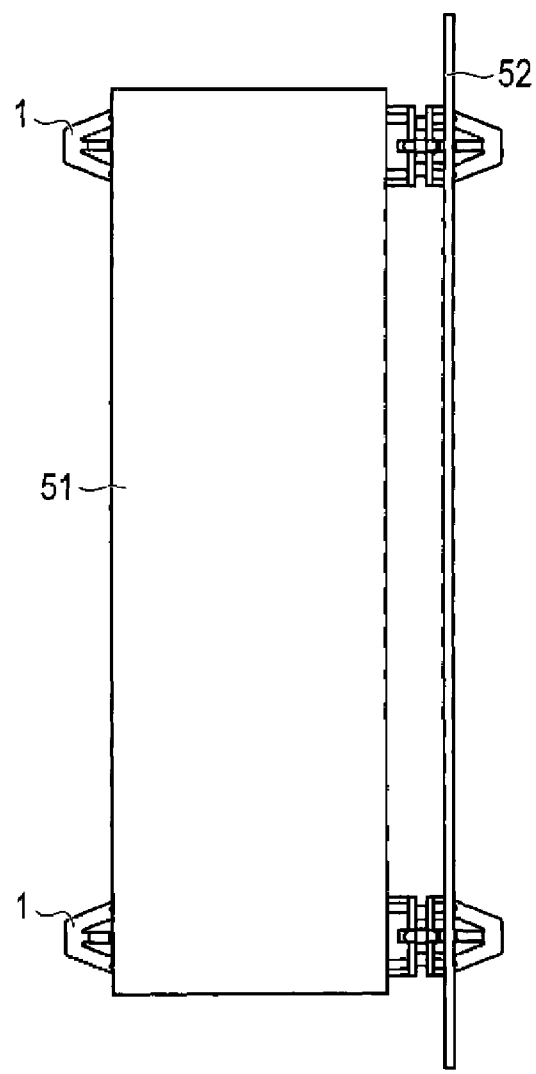
FIG. 5A is an explanatory diagram describing another usage state of the fixture according to the first embodiment.
Figure 5B:
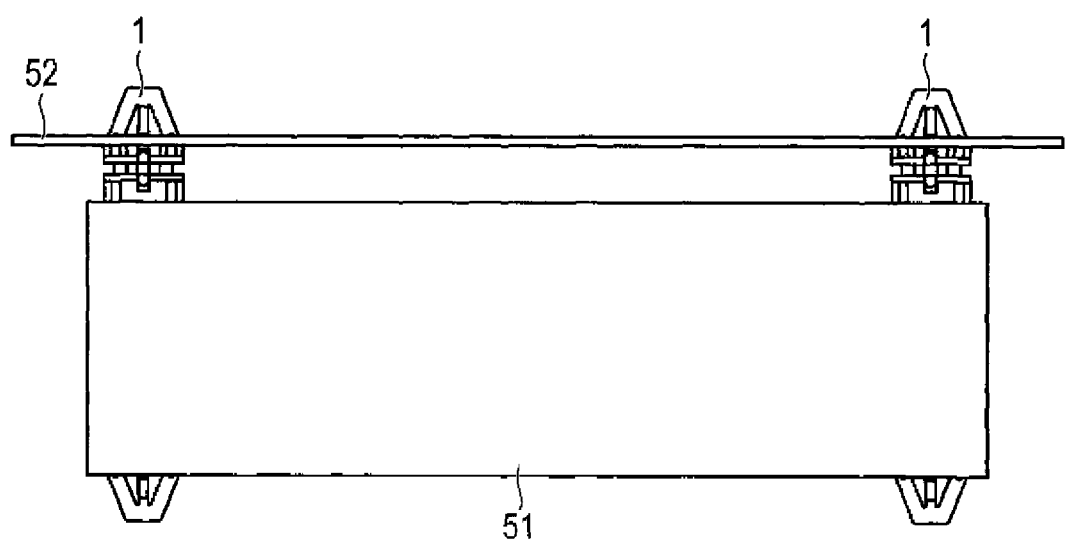
FIG. 5B is an explanatory diagram describing yet another usage state of the fixture according to the first embodiment.
Figure 6:
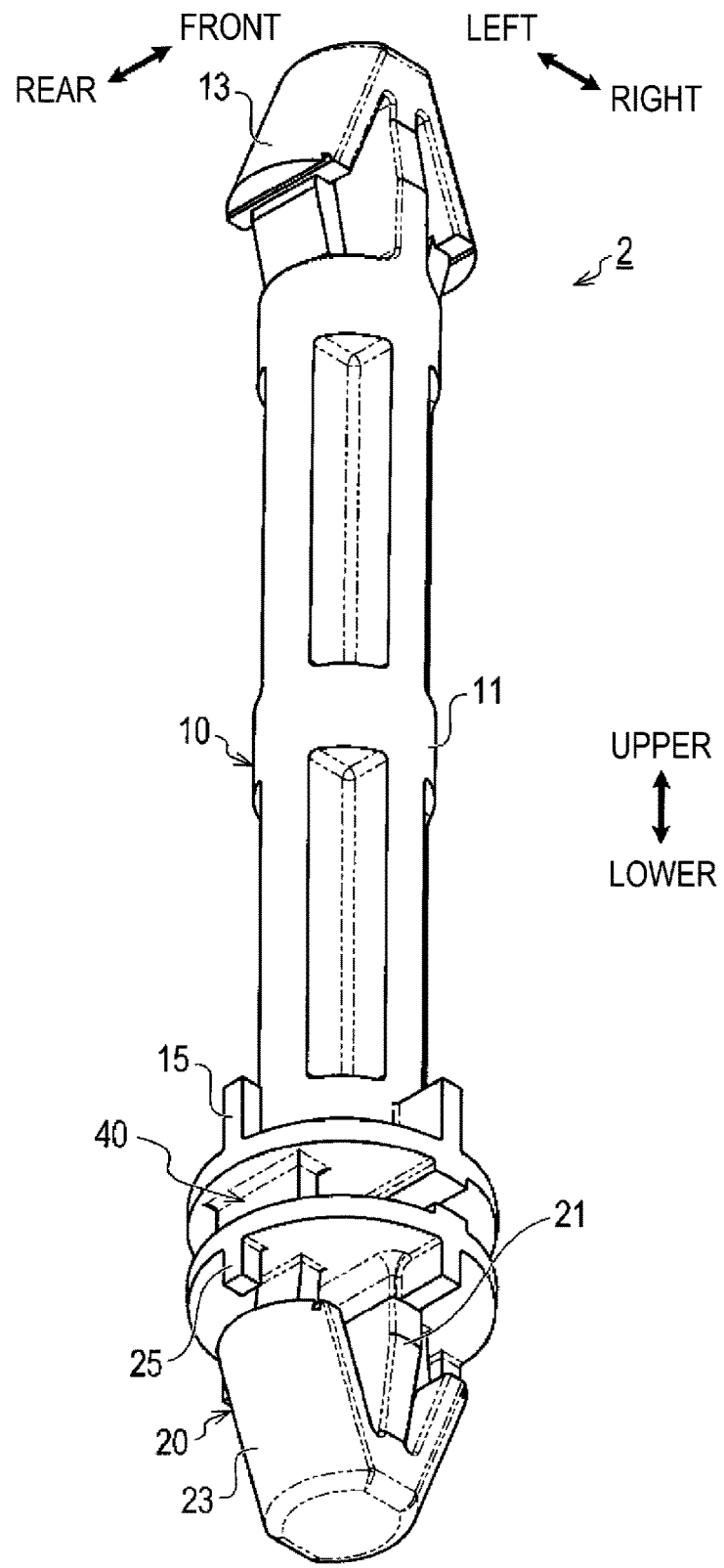
FIG. 6 is a perspective view of a fixture according to a second embodiment.

Note that, as illustrated in FIG. 3B as an example, the fixture 1 can be used for an application that fixes the fan 51 to the upper side of the horizontally disposed panel 52. Besides, as illustrated in FIG. 5A as an example, the fixture 1 can be used for an application that fixes the fan 51 to the side surface of the vertically disposed panel 52. In addition, as illustrated in FIG. 5B as an example, the fixture 1 can be also used for an application that fixes the fan 51 to the lower side of the vertically disposed panel 52.

(2) Second Embodiment

Figure 7A:
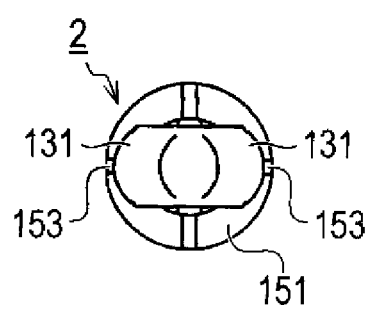
FIG. 7A is a plan view of the fixture according to the second embodiment.
Figure 7B:
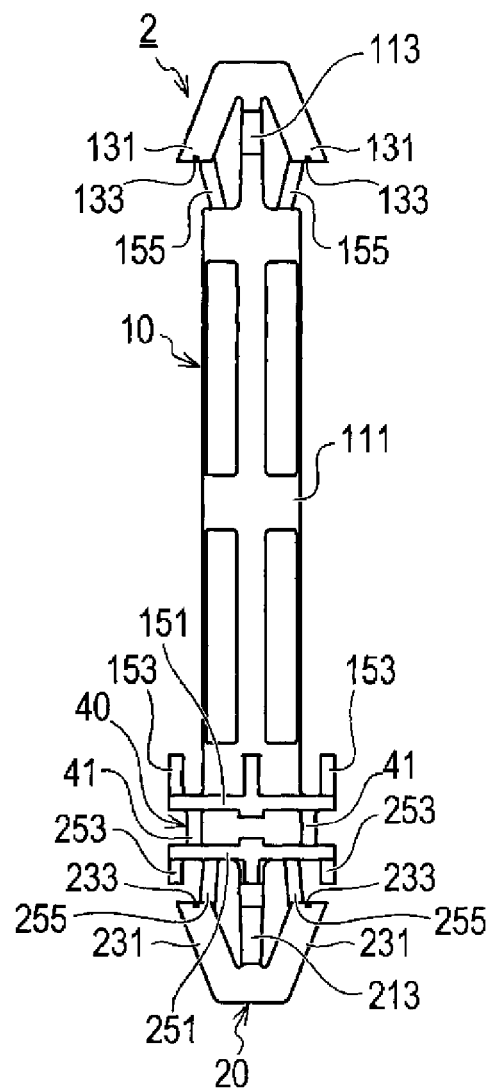
FIG. 7B is a front view of the fixture according to the second embodiment.
Figure 7C:
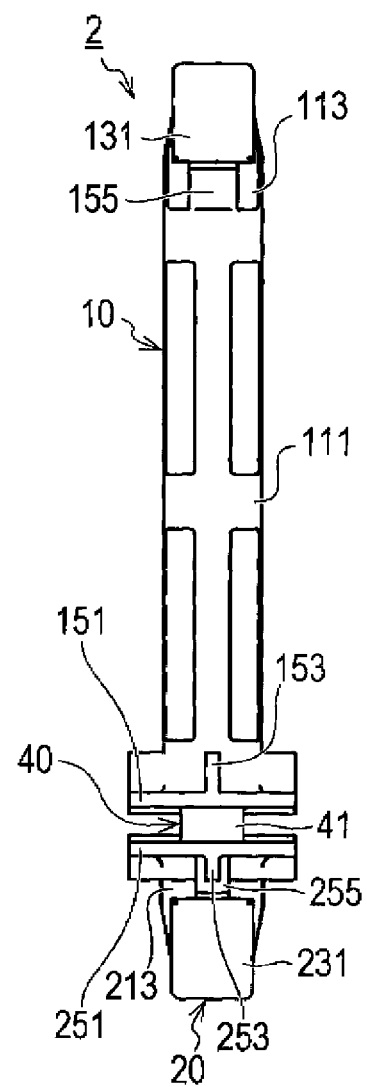
FIG. 7C is a right side view of the fixture according to the second embodiment.
Figure 7D:
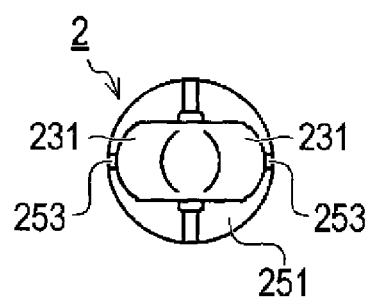
FIG. 7D is a bottom view of the fixture according to the second embodiment.

Next, the second embodiment will be described. In the second embodiment, only a part of the configuration exemplified in the first embodiment is changed. Thus, differences from the first embodiment are mainly described in detail, reference numerals same as those of the first embodiment are given for the parts similar to those of the first embodiment, and descriptions thereof will be omitted. Note that the left side view of a fixture 2 appears the same as the right side view (see FIG. 7C). The back view of the fixture 2 appears the same as the front view (see FIG. 7B).

As illustrated in FIG. 6, FIG. 7A, FIG. 7B, FIG. 7C, and FIG. 7D, the fixture 2 includes the two mounted portions 10, 20 and an interposing portion 40. The interposing portion 40 of the fixture 2 has a structure different from the interposing portion 30 provided with the fixture 1 according to the first embodiment.

Specifically, the interposing portion 40 includes two coupling portions 41. The two coupling portions 41 are both formed in a substantially prismatic shape with a rectangular cross-sectional shape perpendicular to the up-down direction. One ends of the coupling portions 41 are each connected to one mounted portion 10 and the other ends of the coupling portions 41 are each connected to the other mounted portion 20. The bending rigidity of the coupling portion 41 is lower than that of the shaft portion 111. Additionally, the two coupling portions 41 have a rotational symmetry in which when the fixture 1 is rotated by 180 degrees around an axis line extending in the up-down direction, the coupling portions 41 have the shape same as that before the rotation. Note that the structures other than the interposing portion 40 are the same as those of the fixture 1 according to the first embodiment.

With the above-described fixture 2 as well, when the fan 51 vibrates, as long as the vibration contains a component causing the horizontal displacement, the coupling portions 41 elastically deform in the interposing portion 40, thus permitting the fan 51 and the panel 52 to be relatively displaced in the horizontal direction. Then, in association with the deformation of the coupling portions 41, the vibrational energy is lost. In other words, the specific configuration of the interposing portion 40 is not limited to the one described in the first embodiment as an example.

(3) Other Embodiments

The exemplary embodiments have been used to describe the fixture, but should not be construed to be any more than an example of one aspect of the present disclosure. That is, the present disclosure is not limited to the above-described exemplary embodiments and can be implemented in various forms without departing from the technical concept of the present disclosure.

For example, while the embodiments have been described with the example of suppressing the vibration in the up-down direction in both of the two mounted portions 10, 20, the vibration in the up-down direction may be suppressed by the mounted portion of any one of the two mounted portions 10, 20. In this case, even when a mechanism for suppressing the vibration in the up-down direction is omitted in the other mounted portion, this does not cause a problem as long as the one mounted portion exhibits the equivalent vibration-damping effect. However, obviously, exhibiting the vibration-damping effect by both of the two mounted portions 10, 20 increases the vibration-damping effect.

Additionally, while the embodiments have been described with the example of the interposing portion 30 including the three coupling portions 31 and the example of the interposing portion 40 including the two coupling portions 41, the coupling portion may be one or four or more.

Note that a function realized by a single constituent element in each the above-described embodiments may instead be realized by a plurality of constituent elements. Further, it may be configured such that the functions realized by a plurality of components may be realized by a single component. A part of the configuration of each of the above embodiments may be omitted. In addition, at least a part of the configuration of each of the above-described embodiments may be added to or replaced for the configuration of the other above-described embodiments, or the like.

(4) Complement

Note that, as apparent from the exemplary embodiments described above, the fixture of the present disclosure may be further provided with configurations such as those given below.

In one aspect of the present disclosure, the abutment portion may include the projection projecting toward the mounting target. The abutment portion may abut on the mounting target at the distal end in the projection direction of the projection. Meanwhile, the check portion may include the snap piece. One side of the snap piece elastically deforms and narrows down in width when the snap piece is inserted into the mounting hole. After the snap piece passes through the mounting hole, the elastically deformed shape is restored and the snap piece extends in width to be caught on the first object on the outlet side of the mounting hole. When any one of the mounting target or the fixture performs the vibration containing the component that relatively displaces the mounted portion and the strut portion in the direction parallel to the insertion direction, the projection and the snap piece may deform according to the displacement to suppress the vibration in the direction parallel to the insertion direction.

In one aspect of the present disclosure, the snap piece may have the contact surface in contact with the mounting target. The contact surface may have the groove to reduce the contact area with the mounting target compared to a case of without the groove.

In one aspect of the present disclosure, the interposing portion may include the plurality of coupling portions. The plurality of coupling portions may have one ends each connected to the one mounted portion and other ends each connected to the other mounted portion.

In one aspect of the disclosure, the plurality of coupling portions may have the rotational symmetry in which when the fixture 1 is rotated by 360/n degrees (where n is an integer of 2 or greater) around the axis line parallel to the insertion direction, the coupling portions have the shape same as the shape before the rotation.

The present invention is not limited to the embodiments described above, and various changes and modifications can be made without departing from the spirit and scope of the present invention. Accordingly, the following claims are appended to disclose the scope of the present invention.

The present application claims priority based on Japanese Patent Application No. 2018-181935, filed on Sep. 27, 2018, the entire contents of which are incorporated herein by reference.

REFERENCE SIGNS LIST 1, 2 . . . Fixture
10, 20 . . . Mounting portion
11, 21 . . . Strut portion
111 . . . Shaft portion
113, 213 . . . Plate-like portion
13, 23 . . . Check portion
131, 231 . . . Snap piece
133, 233 . . . Groove
15, 25 . . . Abutment portion
151, 251 . . . Circular plate portion
153, 253 . . . Projection
155, 255 . . . Band-like portion
30, 40 . . . Interposing portion
31, 41 . . . Coupling portion
51 . . . Fan
52 . . . Panel

The invention claimed is:

1. A fixture used to fix a first object to a second object, the fixture configured to suppress transmission of vibration from one of the objects to the other object, the fixture comprising:
two mounted portions in which the first object is a mounting target of the one mounted portion and the second object is a mounting target of the other mounted portion, the two mounted portions being mounted to the respective mounting targets; and
an interposing portion interposed between the two mounted portions, wherein among the two mounted portions, at least the one mounted portion includes:
a strut portion insertable into a mounting hole provided in the mounting target, the strut portion being disposed in the mounting hole when the strut portion is inserted into the mounting hole, the strut portion being disposed on an axis line;
a check portion provided on a distal end side in an insertion direction to the mounting hole on the strut portion, the check portion configured to catch on the mounting target on an outlet side of the mounting hole when the strut portion is inserted into the mounting hole from an inlet side, wherein the check portion suppresses pulling out the strut portion in a direction opposite to the insertion direction to the mounting hole the check portion including an elastically deformable snap piece configured to narrow down in width when the snap piece is inserted into the mounting hole and restores its elastically deformed shape after the snap piece passes through the mounting hole, whereby the snap piece extends in width to be caught on the first object on the outlet side of the mounting hole; and
an abutment portion provided on a rear end side in the insertion direction to the mounting hole on the strut portion, the abutment portion configured to abut the mounting target on the inlet side of the mounting hole when the strut portion is inserted into the mounting hole, wherein the abutment portion suppresses pushing the strut portion into the insertion direction to the mounting hole further, the abutment portion including a projection projecting toward the mounting target, the abutment portion abutting the mounting target at a distal end in a projection direction of the projection,
wherein when vibration of any of the mounting target or the fixture relatively displaces the mounted portion and the strut portion in a direction parallel to the insertion direction, the check portion and the abutment portion deform according to the displacement to suppress vibration in a direction parallel to the insertion direction,
wherein when vibration of any of the mounting target or the fixture relatively displaces the two mounted portions in a direction parallel to a plane perpendicular to the insertion direction, the interposing portion deforms according to the displacement to suppress vibration in a direction parallel to the plane perpendicular to the insertion direction,
wherein when vibration of any of the mounting target or the fixture relatively displaces the mounting target and the strut portion in the direction parallel to the insertion direction, the projection and the snap piece deform according to the displacement to suppress vibration in the direction parallel to the insertion direction, and
wherein the snap piece has a contact surface in contact with the mounting target in the direction opposite to the axis line, the contact surface and the insertion direction being perpendicular to each other, and the contact surface has a groove to reduce a contact area with the mounting target.

2. The fixture according to claim 1, wherein the interposing portion includes a plurality of coupling portions, each of the plurality of coupling portions having one end connected to the one mounted portion and another end connected to the other mounted portion.

3. The fixture according to claim 2, wherein the plurality of coupling portions have a rotational symmetry defined by rotation of the fixture by 360/n degrees around the axis line parallel to the insertion direction, where n is an integer of 2 or greater.

* * * * *